United States Patent
Murakami

(10) Patent No.: US 6,581,022 B2
(45) Date of Patent: Jun. 17, 2003

(54) VEHICLE AIR CONDITIONING APPARATUS

(75) Inventor: Kazuyuki Murakami, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 30 days.

(21) Appl. No.: 09/799,168

(22) Filed: Mar. 5, 2001

(65) Prior Publication Data

US 2001/0020221 A1 Sep. 6, 2001

(30) Foreign Application Priority Data

Mar. 6, 2000 (JP) .................................. 2000-060993

(51) Int. Cl.$^7$ ............................................. G01K 17/00
(52) U.S. Cl. ......................................... 702/136; 62/133
(58) Field of Search .................. 62/126, 133; 126/99 R; 236/13; 702/136, 32, 179, 22; 707/100; 706/1; 705/11; 73/31.01; 700/167, 293; 356/608; 340/907, 910; 434/236; 166/53; 228/102

(56) References Cited

U.S. PATENT DOCUMENTS 4,996,849 A * 3/1991 Burst et al. .................... 62/133
5,062,409 A * 11/1991 Kamanaka et al. ........... 126/99
5,582,021 A * 12/1996 Masauji ......................... 62/126
6,016,964 A * 1/2000 Ohkubo ......................... 236/13

FOREIGN PATENT DOCUMENTS

JP          9-52512          2/1997

* cited by examiner

Primary Examiner—John Barlow
Assistant Examiner—Xiuqin Sun
(74) Attorney, Agent, or Firm—Brinks Hofer Gilson & Lione

(57) ABSTRACT

A control unit takes in a set temperature, a vehicle-internal temperature, an ambient temperature, an engine-water temperature, a sun load and a vehicle speed from a means for setting a temperature of the air inside a vehicle and sensors. The control unit determines whether a failure has occurred in the internal-air-temperature sensor and the external air temperature sensor. If a failure is determined in any of the sensors, the control unit fetches a substitute value registered in advance in the substitute-value table. Then, the outlet temperature as well as the difference between the vehicle-internal temperature and the set temperature are determined from the signals generated by the sensors. A driving voltage of the FAN motor and switching position of the outlet flap are subsequently computed. If a failure in either of the internal-air-temperature sensor and the external air temperature sensor is determined, an opening of the air-mix flaps is then set.

6 Claims, 5 Drawing Sheets

VEHICLE AIR CONDITIONING APPARATUS

BACKGROUND OF THE INVENTION

1. Field of the Invention

The present invention relates to an air-conditioning apparatus of a vehicle. More particularly, the present invention relates to a temperature control means installed inside a vehicle for use in the event of a failure of a sensor provided in the vehicle.

2. Description of the Related Art

As is commonly known, an air-conditioning duct of a vehicle is equipped with a blower, an evaporator, a heater, air-mix flaps and outlet flaps. The blower takes in external air, introducing it to the inside of the vehicle as well as circulates air inside the vehicle. The evaporator reduces the temperature and the humidity of the air blown by the blower. The heater heats the air blown by the blower. The air-mix flaps regulate the amount of air blown to the heater. The outlet flaps distribute air adjusted to a predetermined temperature to appropriates outlets. Thus, air which has been cooled and dehumidified by the evaporator, or air heated by the heater after being cooled and dehumidified by the evaporator is distributed to the outlets in the vehicle.

The air-flow quantity of the blower, the opening of the air-mix flap and switching positions of the outlet flaps are controlled by commands issued by a control unit. To put it in detail, the control unit computes the temperature of air blown from the outlets (outlet temperature) from an internal air temperature (set temperature) set by the user as well as an external temperature, an engine water temperature, a sun load, a vehicle speed and the air-flow quantity, which are measured by sensors. Then, the control unit computes control signals for the blower, the air-mix flaps and the outlet flaps by using the outlet temperature as a parameter. Subsequently, the control unit supplies the control signals to motors for driving the blower, the air-mix flaps and the outlet flaps in order to adjust the air-flow quantity of the blower, the opening of the air-mix flaps and the switching positions of the outlet flaps.

By the way, in the event of a failure occurring in a sensor such as an internal-air-temperature sensor and an external air temperature sensor required in the computation of the outlet temperature in the air-conditioning apparatus having the configuration described above, the outlet temperature cannot be calculated. When a failure occurs in such a sensor, it is thus impossible to control the air-flow quantity of the blower, the opening of the air-mix flaps and switching positions of the outlet flaps.

Thus, in order to solve the problem described above, the control unit employed in the conventional air-conditioning apparatus is monitoring the operations of the sensors in order to determine whether or not the sensors operate normally. In the event of a failure occurring in a sensor, the control unit uses a value serving as a substitute for a value supposed to be output by the failing sensor in the computation of an outlet temperature to be used later in control of the air-flow quantity of the blower, the opening of the air-mix flaps, and the switching positions of the outlet flaps. The substitute value is registered in advance.

In the event of a failure occurring in a sensor, since computation of the outlet temperature, control of air-flow quantity of the blower, control of the opening of the air-mix flap and control of switching position of the outlet flaps are carried out using a constant substitute value regardless of the actual value, leaving the case of the substitute value close to an actual sensor value out of the question, there is raised a problem of impossibility to properly execute control based on a reality in case a substitute value is much different from an actual sensor value. In particular, the opening of the air-mix flaps is directly related to the temperature of air blown to the inside of the vehicle from the outlet. Thus, unless control of the opening of the air-mix flaps is executed on the basis of a reality, the temperature of air actually blown to the inside of the vehicle from the outlets is greatly different from the air temperature desired by a passenger, raising a problem of discomfort felt by the passenger.

SUMMARY OF THE INVENTION

It is thus an object of the present invention to provide a vehicle's air-conditioning apparatus capable of supplying air at a temperature desired by a passenger from outlets even in the event of a failure occurring in a sensor.

In order to solve the problem described above the present invention comprises: a blower, an evaporator, a heater, air-mix flaps and outlet flaps, which are provided in an air conditioning duct of the vehicle; sensors for detecting input parameters required in computation of an outlet temperature; and a control unit for inputting signals generated by the sensors as well as controlling an air-flow quantity of the blower and controlling an opening of the flaps, wherein the control unit monitors the sensors to determine whether the sensors are functioning normally and, when one or some of the sensors are determined to have failed, the control unit computes the outlet temperature using the replacement value registered in advance each serving as a substitute for a value supposed to be outputted by one of the failing sensors, switches positions of the outlet by controlling the air-flow quantity of the blower and opening of the outlet flaps based on the computed value, and controls the opening of the air-mix flaps based on a set value set by the user independently of the outlet temperature computed by using the replacement values.

As described above, a passenger is allowed at least to set the temperature of air blown from the outlets at a desired value in case the replacement value is greatly different from the actual air temperature. Thus, it is possible to solve or lessen the problem of discomfort felt by the passenger due to excessively cold or excessively hot blown air.

The opening of the air-mix flap can be subjected to uniformly proportional control according to the set temperature or multi-stage proportional control according to the set temperature. Appropriate temperature adjustment can be carried out by subjecting the opening of the air-mix flap to a uniformly proportional control. Further, since a control in response to a capacity of the heater provided to a duct system can be realized by subjecting the opening of the air-mix flap to a multi-stage proportional control, fine temperature adjustment is possible.

DETAILED DESCRIPTION OF THE PREFERRED EMBODIMENT

Figure 1:
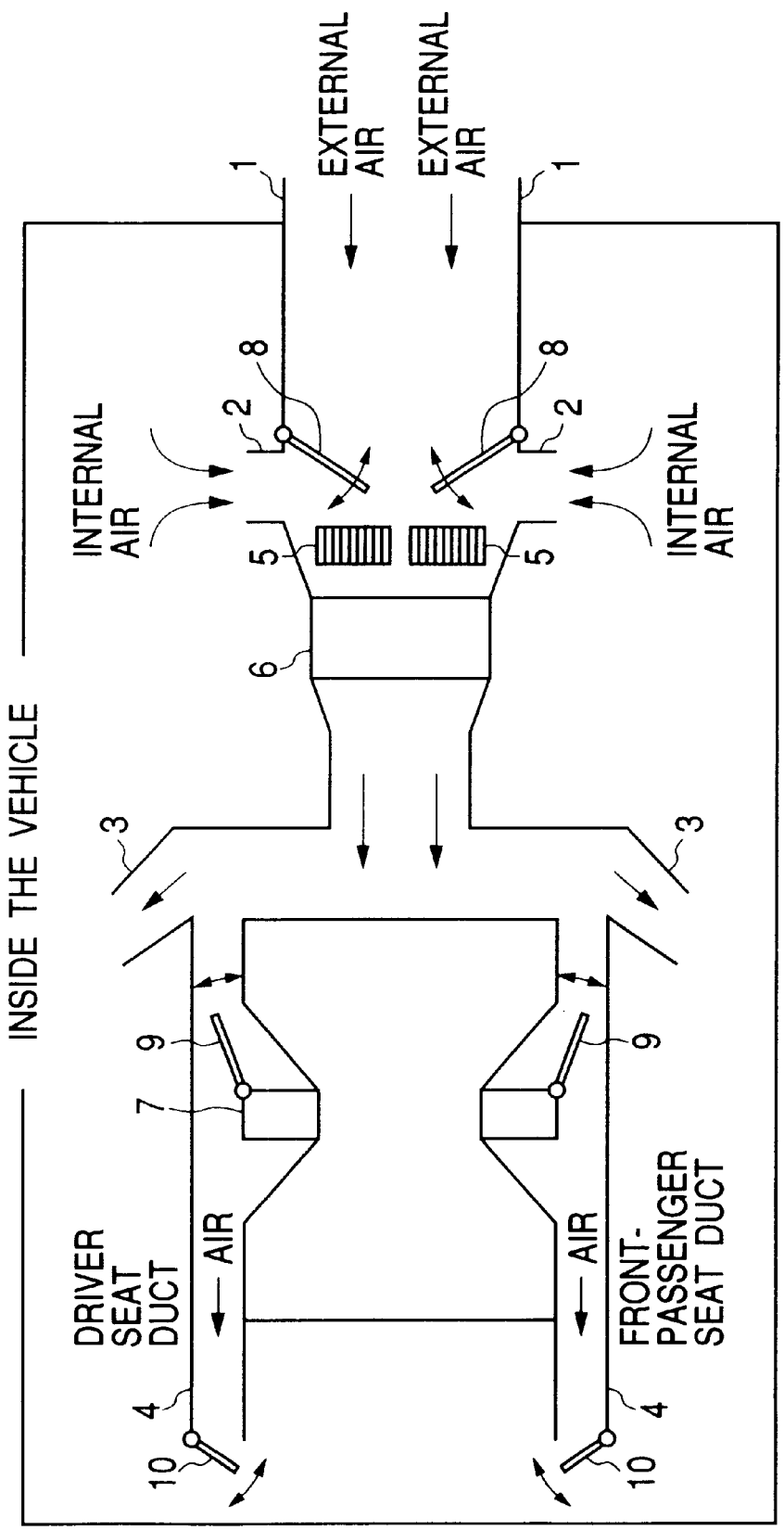
FIG. 1 is a diagram showing the configuration of an air-conditioning duct mounted on a vehicle.

As shown in FIG. 1, an air-conditioning duct employed in this embodiment comprises a drive-side duct and a front-seat-passenger-side duct, which each have an external-air intake 1, an internal-air intake 2, a cool-air direct outlet 3 and a cooled-warmed-mixed-air outlet 4. Among the external-air intake 1, the internal-air intake 2 and the cool-air direct outlet 3, a blower 5 for drawing external air or circulating internal air, an evaporator 6 for reducing the temperature and the humidity of air blown by the blower 5 are provided, and a heater 7 is provided between the blower 5 and the evaporator 6 on one side and the cooled-warmed-mixed-air outlet 4 on the other side. The external-air intake 1 has re-circulation flaps 8 for switching introduction of air from absorption of external air to absorption of internal air or vice versa. On the flow path of cooled-warmed-mixed air, air-mix flaps 9 are provided for adjusting the temperature of the cooled-warmed mixed air. On the cooled-warmed-mixed-air outlet 4 of the cooled-warmed-mixed air, outlet flaps 10 are provided for changing the direction of the cooled-warmed-mixed air among settings such as front, floor and defrost.

Figure 2:
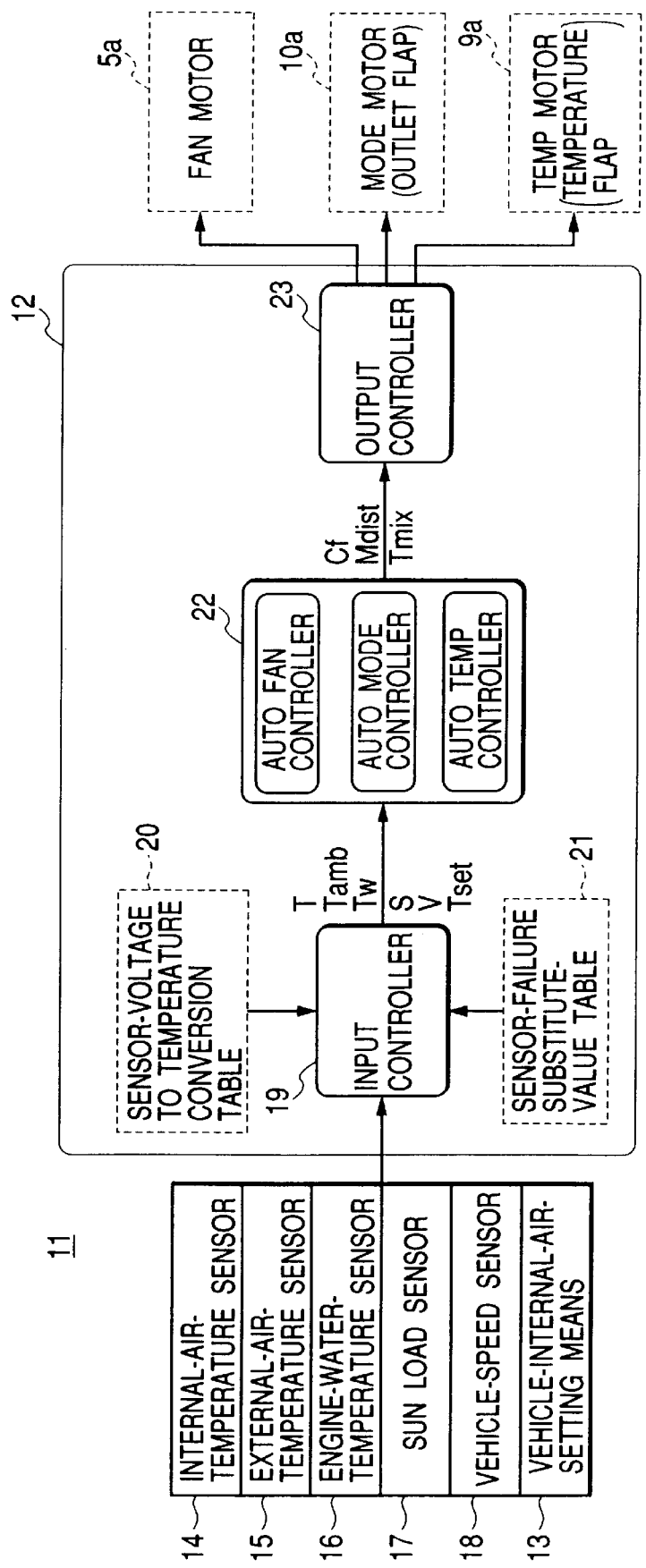
FIG. 2 is a block diagram showing a motor control unit employed in the embodiment.

It should be noted that the blower 5, the air-mix flaps 9 and the outlet flaps 10 are provided with a FAN motor 5a, a TEMP motor 9a and a MODE motor 10a respectively as shown in FIG. 2. By controlling control inputs (voltages) supplied to the motor 5a, the motor 9a and the motor 10a, it is possible to adjust the flow quantity of air absorbed into the inside of the vehicle, the temperature of the air and the position of the outlet.

As shown in FIG. 2, a motor controller 11 for controlling the motor 5a, the motor 9a and the motor 10a comprises a control unit 12, an vehicle-internal-air-setting means 13, an internal-air temperature sensor 14, an external air temperature sensor 15, an engine-water temperature sensor 16, a sun load sensor 17 and a vehicle-speed sensor 18. The control unit 12 comprises a vehicle-internal-temperature-setting means 13, an input unit 19 for inputting signals generated by the sensors 14 to 18, a sensor-voltage-to-temperature conversion table 20 for storing relations between the signals output by the sensors 14 to 18 and parameter values, a sensor-failure substitute-value table 21, a computing unit 22 and an output unit 23 for outputting driving voltages to the motor 5a, the motor 9a and the motor 10a by output signals from the computing unit 22. The computing unit 22 inputs a vehicle speed V, a sun load S, an engine-water temperature $T_w$, an vehicle-external-air temperature $T_{amb}$, a vehicle-internal-air temperature T and a set temperature $T_{set}$ from the input unit 19, computing a driving voltage Cf of the FAN motor 5a, a switchable position $M_{dist}$ of the outlet flaps 10 and an outlet temperature $T_{mix}$.

Figure 3:
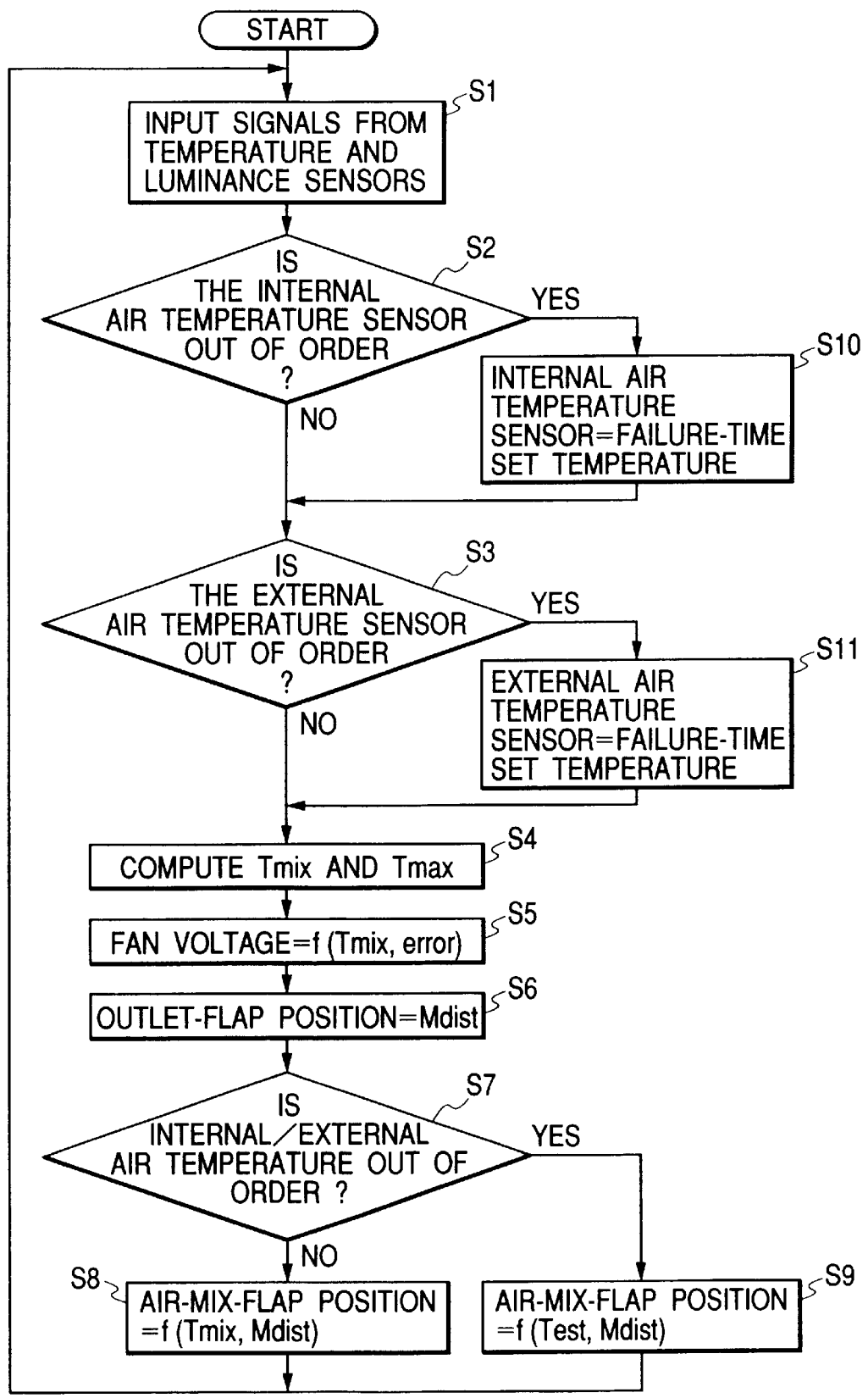
FIG. 3 shows a flowchart representing a procedure of controlling a blower, air-mix flaps and outlet flaps.

The following description explains a procedure to control the blower 5, the air-mix flaps 9 and the outlet flaps 10 by referring to a flowchart shown in FIG. 3.

The flowchart begins with a step S1 at which the control unit 12 takes in a signal output by the vehicle-internal-temperature-setting means 13 and signals generated by the sensors 14 to 18 through the input unit 19 when the ignition key of a vehicle is switched to an accessory position. The control unit 12 converts the signals into a set temperature $T_{set}$, a vehicle-internal temperature T, a vehicle-external-air temperature $T_{amb}$, an engine-water temperature $T_w$, a sun load S and a vehicle speed V by using the conversion table 20.

At the next steps S2 and S3, the control unit 12 determines whether a failure has occurred in the internal-air-temperature sensor 14 and the external air temperature sensor 15 respectively. If a failure did not occur in the internal-air-temperature sensor 14 and the external air temperature sensor 15, the flow of the procedure goes on to a step S4 at which an outlet temperature $T_{mix}$ and as well as a difference $T_{error}$ between the vehicle-internal-air-temperature T and the set temperature $T_{set}$ are found from the signals generated by the sensors 14 to 18.

At the next step S5, a driving voltage Cf to be applied to the FAN motor 5a is computed from the calculated outlet temperature $T_{mix}$ and the temperature error $T_{error}$. At the next step S6, a switchable position $M_{dist}$ of the outlet flaps 10 is found from the calculated outlet temperature $T_{mix}$.

Then, at the next step S7, the control unit 12 determines whether a failure has occurred in any of the internal-air-temperature sensor 14 and the external air temperature sensor 15. If no failure has occurred in any of the internal-air-temperature sensor 14 and the external air temperature sensor 15, the flow of the procedure goes on to a step S8 at which an opening of the air-mix flaps 9 is found from the $T_{mix}$ found at the step S4 and the switchable position $M_{dist}$ of the outlet flaps 10.

If a failure is determined at the step S7 to have occurred in any of the internal-air-temperature sensor 14 and the external air temperature sensor 15, on the other hand, the flow of the procedure goes on to a step S9 at which an opening of the air-mix flaps 9 is found from the set temperature $T_{set}$ set by the vehicle-internal-temperature-setting means 13 and the switchable position $M_{dist}$ of the outlet flaps 10 computed at the step S6.

If a failure is determined at the step S2 to have occurred in the internal-air-temperature sensor 14, on the other hand, the flow of the procedure goes on to a step S10 at which the control unit 12 fetches a substitute value registered in advance in the substitute-value table 21. Then, the flow of the procedure goes on to the step S3. If a failure is determined at the step S3 to have occurred in the external air temperature sensor 15, on the other hand, the flow of the procedure goes on to a step S11 at which the control unit 12 fetches a substitute value registered in advance in the substitute-value table 21. Then, the flow of the procedure goes on to a step S4.

As described above, when a failure occurs in the internal-air-temperature sensor 14 and/or the external air temperature sensor 15 in this air-conditioning apparatus, substitute values read out from the substitute-value table 21 are used in the computation of an outlet temperature $T_{mix}$. The outlet temperature $T_{mix}$ is used as a base for controlling the air-flow quantity of the blower 5 and controlling the switchable positions of the outlet flaps 10. In addition, the opening of the air-mix flaps 9 is also controlled in accordance with the set temperature $T_{set}$ given by the user independently of the outlet temperature $T_{mix}$ calculated on the basis of the substitute values. In this way, in the configuration described above, a passenger is allowed at least to set the temperature of air blown from the cooled-warmed-mixed-air outlet 4 at a desired value in case the substitute value is greatly different from the actual vehicle-internal-air temperature. Thus, it is possible to solve or lessen the problem of discomfort felt by the passenger due to excessively cold or excessively hot blown air.

The opening of the air-mix flaps 9 can be subjected to uniformly proportional control according to the set temperature $T_{set}$ or multi-stage proportional control according to the set temperature $T_{set}$.

Figure 4:
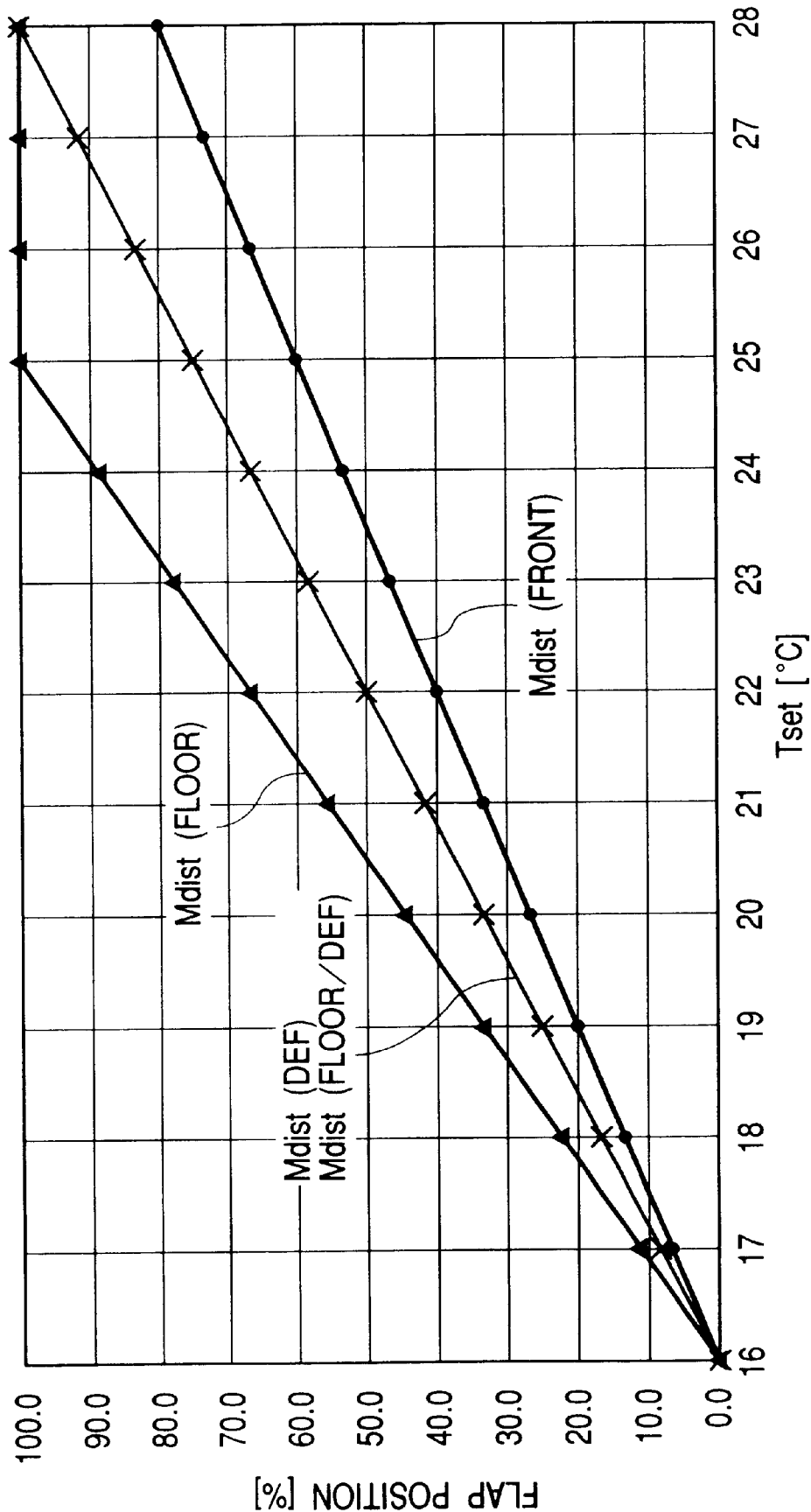
FIG. 4 is a diagram showing typical graphs each representing a relation between a set temperature and the opening of the air-mix flaps.

FIG. 4 is a diagram showing graphs each representing a relation between the set temperature $T_{set}$ and the opening θ of the air-mix flaps 9 in control executed to provide a flap opening uniformly proportional to the set temperature $T_{set}$. In this embodiment, a relation between the set temperature $T_{set}$ and the opening θ of the air-mix flaps 9 can be expressed as follows.

$$\theta = (T_{set} - T_{setmin})/(T_{setmax} - T_{setmin}) \times 100 \qquad (1)$$

In Eq. 1, the symbol $T_{set}$ is a set value of the vehicle internal air temperature actually set by the vehicle-internal-temperature-setting means 13, the symbol $T_{setmin}$ is a minimum value settable by the vehicle-internal-temperature-setting means 13, the symbol $T_{setmax}$ is a maximum value settable by the vehicle-internal-temperature-setting means 13.

In the relations shown in FIG. 4, the middle graph is a relation for a low outlet temperature $T_{mix}$ and for $M_{dist}$ (DEF) or $M_{dist}$ (DEF/FLOOR), where $M_{dist}$ (DEF) is switchable positions of the outlet flaps 10 corresponding to a defrost-only setting of the modes whereas $M_{dist}$ (DEF/FLOOR) is switchable positions of the outlet flaps 10 corresponding to a defrost-and-floor setting of the modes. This graph represents a relation between the opening θ of the air-mix flaps 9 and the set temperature $T_{set}$ changed between a $T_{setmin}$ of 16° C. and a $T_{setmax}$ of 28° C.

The upper graph is a relation for a middle outlet temperature $T_{mix}$ and for $M_{dist}$ (FLOOR), where $M_{dist}$ (FLOOR) is switchable positions of the outlet flaps 10 corresponding to a floor setting of the modes. This graph represents a relation between the opening θ of the air-mix flaps 9 and the set temperature $T_{set}$ changed between a $T_{setmin}$ of 16° C. and a $T_{setmax}$ of 25° C. In this case, values of the opening θ of the air-mix flaps 9 exceeding 100% are represented by a horizontal line for an the opening of 100%.

The lower graph is a relation for a high outlet temperature $T_{mix}$ and for $M_{dist}$ (FRONT), where $M_{dist}$ (FRONT) is switchable positions of the outlet flaps 10 corresponding to a front setting of the modes. This graph represents a relation between the opening θ of the air-mix flaps 9 and the set temperature $T_{set}$ changed between a $T_{setmin}$ of 16° C. and a $T_{setmax}$ of 28° C., which corresponds to a maximum opening θ max of 80%.

It should be noted that, if a temperature desired by a passenger cannot be achieved, the temperature of air blown to the inside of the vehicle can be directly controlled by adjusting the set temperature $T_{set}$ since the signals of the sensors are ignored.

Figure 5:
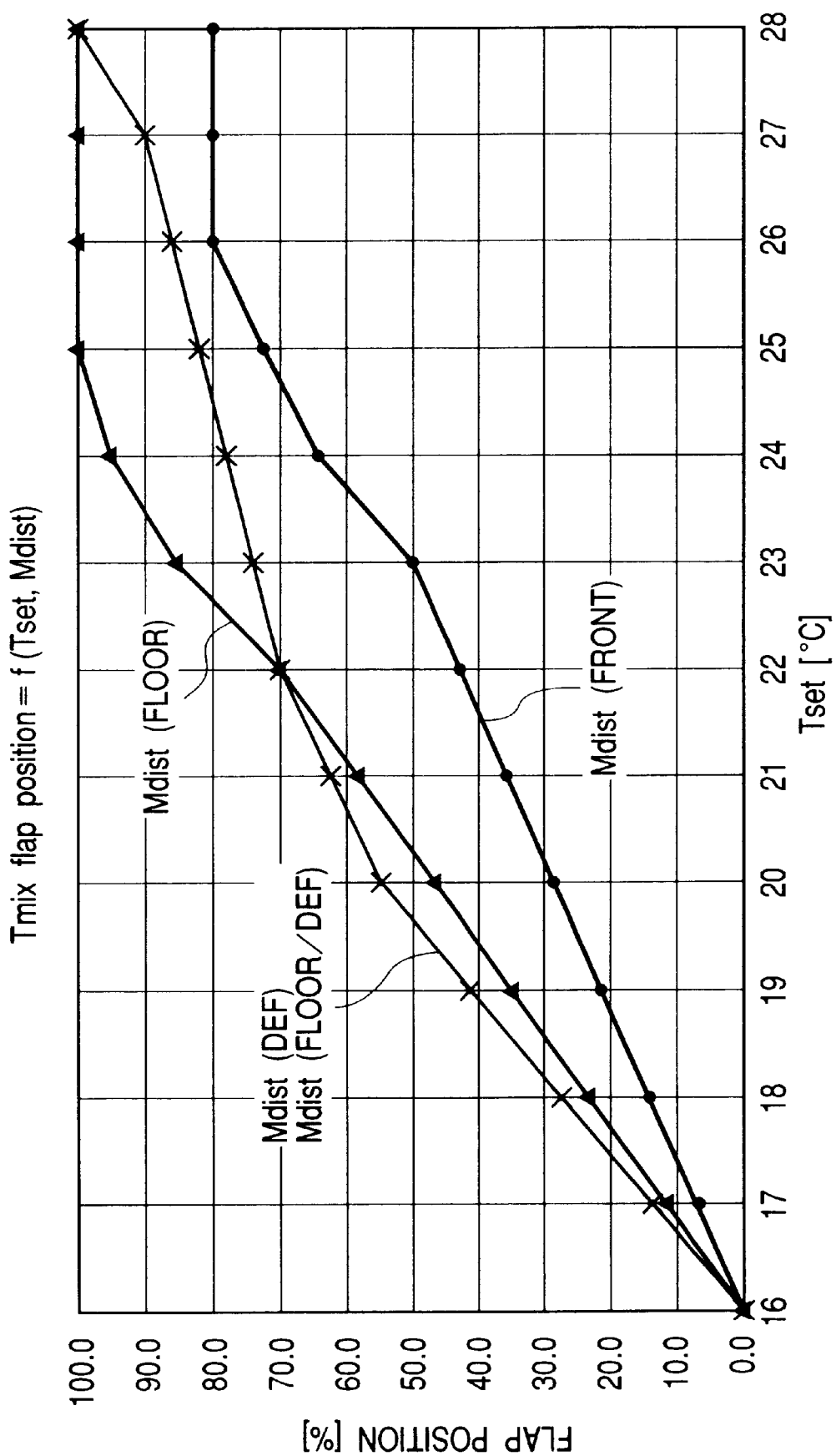
FIG. 5 is a diagram showing other typical graphs each representing a relation between a set temperature and the opening of the air-mix flaps.

FIG. 5 is a diagram showing graphs each representing a relation between the set temperature $T_{set}$ and the opening θ of the air-mix flaps 9 in multi-stage control to produce an opening θ proportional to the set temperature $T_{set}$. In this case, the opening θ of the air-mix flaps 9 can be controlled in accordance with parameters such as the heating power of the heater 7. As a result, fine temperature adjustment is possible.

What is claimed is:

1. An air-conditioning apparatus for a vehicle, comprising:
    a blower, an evaporator, a heater, air-mix flaps and outlet flaps, which are provided in an air-conditioning duct of the vehicle;
    a vehicle compartment temperature setting means for setting a vehicle compartment temperature;
    sensors that detect input parameters required in computation of an outlet temperature; and
    a control unit that inputs signals generated by the sensors as well as controls an air-flow quantity of the blower and controls each of the air mix and outlet flaps,
    wherein the control unit monitors the sensors to determine whether the sensors are functioning normally, when the control unit determines that the sensors are functioning normally, the control unit: computes the outlet temperature using output values generated by the sensors, controls the air-flow quantity of the blower in response to the computed outlet temperature, changes over an outlet position by controlling the outlet flaps and controls an opening of the air-mix flaps in response to the computed outlet temperature,
    when one of the sensors is determined to have failed, the control unit:
        computes the outlet temperature using a replacement value registered in advance for each failing sensor and the output values generated by the sensors that are functioning normally, each replacement value serving as a substitute for a value supposed to be outputted by one of the failing sensors,
        switches positions of an outlet by controlling the air-flow quantity of the blower and the outlet flaps based on the computed value, and
        controls the opening of the air-mix flaps based on a set value set by the vehicle compartment temperature setting means independently of the outlet temperature computed by using the replacement values.

2. An air-conditioning apparatus according to claim 1, wherein the opening of the air-mix flaps is subjected to uniformly proportional control according to the set temperature.

3. An air-conditioning apparatus according to claim 1, wherein the opening of the air-mix flaps is subjected to multi-stage proportional control according to the set temperature.

4. The air-conditioning apparatus of claim 1, wherein the control unit controls the opening of the air-mix flaps based on the position of the outlet flaps.

5. The air-conditioning apparatus of claim 1, wherein the control unit controls the opening of the air-mix flaps based on the position of the outlet flaps independent of whether any of the sensors are functioning normally or failing.

6. The air-conditioning apparatus of claim 1, wherein when at least one sensor is failing, the opening of the air-mix flaps depends on a temperature set by a user and maximum and minimum values settable by the vehicle compartment temperature setting means.

* * * * *